Oct. 27, 1964 A. J. HARDWICK 3,154,768

MAGNETIC DEVICE FOR NONDESTRUCTIVE DATA STORE

Filed Jan. 15, 1962 4 Sheets-Sheet 1

INVENTOR.
ALBERT J. HARDWICK

BY Francis A. Varallo
AGENT

INVENTOR.
ALBERT J. HARDWICK

BY Francis A. Varallo
AGENT

INVENTOR.
ALBERT J. HARDWICK
BY
Francis A. Varallo
AGENT

INVENTOR.
ALBERT J. HARDWICK
BY Francis A. Varallo
AGENT

United States Patent Office 3,154,768

Patented Oct. 27, 1964

3,154,768

MAGNETIC DEVICE FOR NONDESTRUCTIVE DATA STORE

Albert J. Hardwick, West Chester, Pa., assignor to Burroughs Corporation, Detroit, Mich., a corporation of Michigan Filed Jan. 15, 1962, Ser. No. 166,045

22 Claims. (Cl. 340—174)

The present invention relates generally to thin films of ferromagnetic material, and more specifically to means for utilizing the magnetic domain behavior in such material to realize improved nondestructive memory elements and arrays.

Thin ferromagnetic films are coming into ever increasing prominence as computer storage elements. In general, information in binary form, that is, having two possible values, is stored by magnetizing in one of two possible senses a portion of ferromagnetic material having two substantially stable states. Improved methods of using thin films to store data are described and claimed in copending application for U.S. patent, Serial No. 728,212, entitled "Magnetic Data Store," filed in the name of Eric E. Bittmann, and assigned to the same assignee as the present application. A relation between the value of the bit of information and the sense of magnetization is arbitrarily established, and the ferromagnetic material is magnetized according to known means. To determine in which sense or state the material has been left magnetized, it is conventional to apply to the material a strong magnetizing field, known as a reading or read-out field, in a reference sense. This reference sense is sometimes referred to as being either the "positive" or "negative," or the "one" or "zero" state. Conventional methods of reading out the information stored in the magnetic element leave the magnetic material in the reference state regardless of the state of the element prior to the reading operation, thereby destroying the information previously stored therein.

The present invention contemplates the use of thin magnetic films with their inherent advantages of reliability, compactness and high operational speed in nondestructive read-out mode with its concomitant convenience and economy.

Thin films of ferromagnetic material may be produced which have a uniaxial anisotropy, or preferred (easy) axis or direction of magnetization, and which films may be stably magnetized in either one of two possible states along such an axis. The switching mechanism of magnetic films, of which the thickness is less than 5000 angstroms, is predominately spin rotational. Such film tend to undergo reversals of magnetization from one stable state to the other state by exhibiting a rotation of the direction of their magnetization, rather than by the reversal of magnetization by domain wall motion.

In copending application for U.S. patent, Serial No. 147,676, entitled "Nondestructive Magnetic Data Store," filed in the names of Eric E. Bittmann and Joseph W. Hart, and assigned to the same assignee as the present application, there is described and claimed the formation of an irreversible domain within a ferromagnetic film element by the application and removal of a transverse field to a restricted, narrow region of the element. The magnetic state of this irreversible domain is indicative of the data stored therein. Repeated interrogations of this irreversible domain produce output signals indicative of the stored data, without altering the direction of magnetization of the domain. It is in this latter sense that the interrogated domain is characterized, both in the copending and present applications, as being "irreversible." Actually since the equilibrium polarity of the interrogated domain depends upon the polarity of the remainder of the film element, reversal of the magnetization in the remainder of the film element, effected for example by the writing of new information into the element as described hereinafter, would result in reversing the equilibrium state of this "irreversible domain." The film element taught in the latter copending application consists of magnetic material having substantially the same value magnetic parameters, $H_C$, the coercivity and $H_K$, the anisotropy fiield, throughout.

In accordance with the present invention, and with general reference to a preferred embodiment, there is provided a film element comprising regions or sections of magnetic material so arranged that the material of a central section has a lower absolute value of anisotropy field, than the absolute value of such field for the magnetic material of adjacent or neighboring sections. Such lower value of anisotropy field found in the central section is designated $H_{K1}$; the higher value of anisotropy field in the neighboring sections is designated $H_{K2}$.

The ferromagnetic film of the present invention, when initially completely magnetized in one state, acts substantially as a single large magnetic domain. This domain is stable as long as no external field is applied. The application of a field transverse to the preferred direction and having a field strength approximately equal to $H_{K1}$, causes the magnetic dipoles in the region of $H_{K1}$ material to rotate toward the transverse (hard) direction. Removal of this transverse field leaves the dipoles in an unstable position. The demagnetization forces of the neighboring domains of $H_{K2}$ material cause the dipoles to rotate to the opposite magnetic state. An irreversible domain of opposite state is thus formed inside the original domain by the application and removal of the transverse field. It should be noted that the area of this irreversible domain is substantially that of the region of magnetic material having the lesser value of anisotropy field, $H_{K1}$. Repeated application and removal of the transverse field to read out the information stored in the magnetic element will not change the magnetization of this newly formed domain. Thus the reading operation does not permanently alter the direction of magnetization of the element, and is therefore non-destructive.

The anisotropic properties of thin magnetic films keep the magnetization vector, M, parallel to the preferred direction of magnetization. This position corresponds to the minimum anisotropic energy condition, and to the maximum value of anisotropic field. Should the M vector be rotated 90 degrees, it will pass through a gradient where the anisotropic energy increases to its maximum value and the anisotropic field decreases to zero.

A magnetic domain existing as a portion of a particular domain arrangement has all of the dipoles within it, aligned in the same magnetic direction. This is characteristic of uniaxial anisotropy. A demagnetizing field originates from the dipoles within a domain. A mmf. exists across the poles of this domain, causing the demagnetizing field to act opposite to the directions of magnetization. The demagnetizing field at any point on the surface of a thin film depends upon the domain pattern surrounding this point. The demagnetizing field is usually assumed to act parallel to the preferred direction, in the plane of the film, when all dipoles are parallel or antiparallel to the preferred direction. The amplitude of the demagnetizing field depends upon the area of the domain and the reluctance of the path between the poles. Experiment has shown that the demagnetizing field from a large single domain can exert a force strong enough to deflect dipoles separated by 0.03 inch. This property of the demagnetizing field forms the basis for the present nondestructive read-out operation.

Rotation of the M vector to a 90 degree position requires that an external field be applied to the magnetic film. This field called the transverse field is applied in the hard direction of magnetization. As applied to the magnetic element of the present invention as hereinbefore described, the amplitude of the transverse field must be greater than $H_{K2}$, the maximum value of the saturating magnetization field in the hard direction found in the element. If the transverse field is localized to a small region of the film, the dipoles in this region rotate to the hard direction, forming a 90 degree wall. However, this is only partly true, since the surrounding dipoles which are not affected by the transverse field, generate a demagnetizing field influencing the 90 degree domain. This field will deflect the M vectors, or dipoles, from the 90 degree position.

The demagnetizing field due to the neighboring domains, the transverse field, and the anisotropy properties determine the orientation of each dipole in the domain. The center of the area is less influenced by the neighboring demagnetizing field than the edges. An external field applied parallel to the preferred direction of magnetization will either add to or subtract from the demagnetizing fields. This external field will cause the M vectors of domains in the central area to rotate from 90 degrees toward the direction of the external field. The domains near the edges will rotate if the force of this field, plus the demagnetizing field, is sufficient to overcome the anisotropy field. If this is the case the M vector will rotate past 90 degrees toward the opposite state.

If the transverse field applied to the magnetic film is removed, the magnetic dipoles are left in an unstable state in the vicinity of the hard direction, and the resultant forces acting upon these dipoles determine their return to zero or 180 degrees.

The M vectors lying opposite each other form a domain wall. This wall is stable as long as the dipoles on either side are in a minimum energy state. A domain wall may be thought of as having a direction and the direction angle is referred to the preferred direction of magnetization. Stable domain wall angles for films having the properties described herein lie between plus and minus 45 degrees. Some domains show a curved boundary or wall. The domain wall angle for a curved domain wall is defined as the angle between the preferred direction and the tangent to the curve. Domain walls that might occur at angles greater than 45 degrees will appear to grow until the angle is less than 45 degrees. A field in the preferred direction just greater than $H_C$, the coercivity of the film evaluated from the rectangular B-H curve plotted with a field applied in the preferred direction, will remagnetize a narrow area of the film by a domain wall movement. The aforementioned field is produced by current flow in a flat conductor adjacent to the magnetic film. The boundaries of the domain walls, to conform with the conductor, form 45 degree walls in a saw-toothed pattern.

When the parallel field is removed, the newly formed domain breaks into small island domains. These islands are always longer in the preferred direction than in the hard direction. The breakup of this domain seems to be due to the demagnetizing field which tends to maintain closed magnetic paths in the film. Where this field is larger than $H_C$, a reversal of magnetization takes place and these islands are formed.

If a thin film element comprising a central section of $H_{K1}$ material and sections of $H_{K2}$ material contiguous therewith, is initially magnetized in the positive state and a transverse field is applied which is similar in value to that of $H_{K1}$, the dipoles in the central region rotate toward 90 degrees. When the transverse field is removed the mmf. due to the demagnetizing field will rotate the dipoles to the negative state. If a small external parallel field is applied to the film in the same direction as the demagnetizing field, the switching of the desired number of dipoles to the negative state will be facilitated. Thus, a domain of negative state is formed in the $H_{K1}$ material section, surrounded by positive domains. The demagnetizing fields from the original positively magnetized element, which is now split into two parts surrounding the central domain, will act to lock this central domain into a permanent state. The dipoles in the central domain may be rotated toward the hard direction by an externally applied field, while the dipoles in the locking domains remain substantially undisturbed. A strong demagnetizing field is exerted on the dipoles of the central domain in a direction opposite to the state of the locking domain. When the external field is removed the dipoles in the central domain will rotate back to the negative state. Because the central domain exhibits this behavior it is called an irreversible domain. It should be noted that when two neighboring domains are in opposite states, the reluctance of the path for the demagnetizing field is low. The reluctance of this path increases as the dipoles are rotated toward 90 degrees and the demagnetizing field is proportional to the reluctance.

If the thin film had been initially magnetized in the negative state, then an irreversible positive state domain will be formed when a transverse field is applied and removed in substantially the same manner as that hereinbefore described in connection with the film initially magnetized in the positive state.

It is therefore a general object of the present invention to provide an improved magnetic data store.

Another object of the present invention is to provide a data store which is economical, extremely fast, and requires a minimum of auxiliary equipment for its operation.

A further object of the present invention is to provide a nondestructive data store utilizing thin films of ferromagnetic material.

A more specific object of the present invention is to provide a magnetic thin film element comprising sections of magnetic material having different absolute values of anisotropy field and in which the demagnetizing forces of the sections of higher anisotropy field tend to keep the magnetic dipoles of the section of lower anisotropy field aligned in a direction opposite to the direction of the magnetic dipoles in the former sections.

These and other features of the invention will become more fully apparent from the following description of the annexed drawings, wherein:

FIG. 1 is a pictorial representation of a ferromagnetic element in relation to a typical arrangement of conductors, as employed in the practice of the invention;

FIG. 2*a* depicts B-H curves (flux density–magnetic field intensity) displaying typical characteristics of a portion of the magnetic material, having the lesser value of anisotropy field, $H_{K1}$, utilized in the magnetic element of the present invention; FIG. 2*b* depicts B-H curves displaying the typical magnetic characteristics of the remaining portions of magnetic material, having the greater value of anisotropy field, $H_{K2}$, utilized in the magnetic element;

FIG. 3 represents in block form a preferred arrangement of material having different values of anisotropy field which comprise the ferromagnetic element of the present invention;

FIGS. 4*a*, 4*b* and 4*c* represent in block form the directions of the magnetic dipoles in a thin film element during the magnetization of the element to the positive state; FIG. 4*d* is a vector diagram which illustrates the directions of the various fields influencing the magnetization of the element;

FIGS. 5*a*, 5*b* and 5*c* represent in block form the directions of the magnetic dipoles in a thin film element during the formation of an irreversible domain of negative state surrounded by domains of positive state; FIG. 5*d* is the accompanying field diagram;

FIG. 6 is a diagram depicting the sequence of fields applied to a thin film element and the corresponding induced voltages generated in the sense conductor for writing in and reading out information arbitrarily representative of a binary "1";

FIGS. 7*a*, 7*b* and 7*c* represent in block form the directions of the magnetic dipoles in a thin film element during the magnetization of the element to the negative state; FIG. 7*d* is the accompanying field diagram;

FIGS. 8*a*, 8*b* and 8*c* represent in block form the directions of the magnetic dipoles in a thin film element during the formation of an irreversible domain of positive state surrounded by domains of negative state; FIG. 8*d* is the accompanying field diagram;

Figure 1:
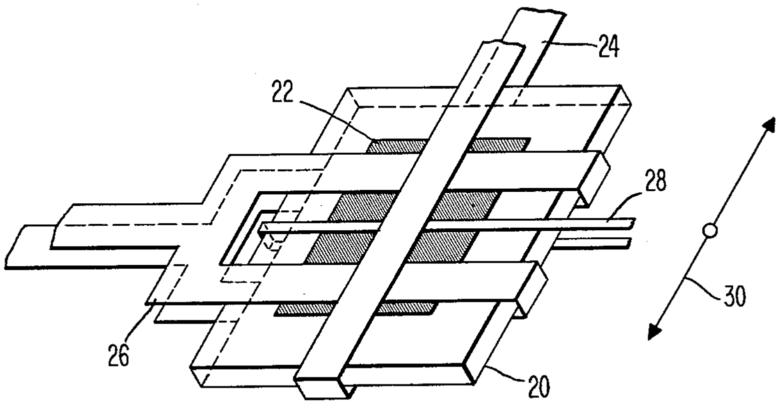

Referring to FIG. 1 there is represented a single unit of a ferromagnetic film element and the associated conductors needed to permit its employment in a data store suitable for use with conventional data handling processing or computing devices. In FIG. 1 the single ferromagnetic film or layer element is depicted as being rectangular in form and is identified by reference numeral 22. In practice the actual geometric form of the element may be other than rectangular, and the invention should not be considered so limited. The conductors or portions of conductors which are intended to affect or be affected by the magnetization of the film element 22 are parallel to the film and in close proximity thereto. The preferred direction of magnetization of the film 22 is indicated by the arrows 30 and lies within the plane of the paper. The conductor 24 oriented parallel to the preferred axis of the film is employed to generate a transverse drive field, referred to hereinafter as either $H_{T1}$ or $H_{T2}$, depending upon the desired strength of the field. The conductor 26 oriented perpendicular to the preferred direction of magnetization is split into two parallel conductors. Each of the latter conductors carries one half of the current required to generate a parallel field of either polarity, later referred to as either $+H_P$ or $-H_P$. Lying between the split conductors is the sense conductor 28. The purpose of providing parallel drive conductors is primarily to lessen the capacitive coupling between the parallel drive conductors and the sense conductor, thereby diminishing the generation of spurious signals in the sense conductor. A base 20 serves as a support for the other items.

In an actually operative embodiment of this invention, the following parameters were employed successfully. The ferromagnetic film element was in the form of a rectangle 0.12 inch by 0.09 inch, about 2000 Angstrom units thick, of nickel-iron alloy, formed by vacuum deposition upon a glass substrate. $H_C$, the coercivity of each section of magnetic material comprising the magnetic film element was approximately one oersted; $H_{K1}$, the lesser anisotropy field, was equal to 1.5 oersteds, $H_{K2}$, the greater anisotropy, 3 oersteds. The perpendicular drive conductors and the sense wire were etched on a printed circuit panel. For convenience the parallel drive and sense conductors were placed on one side of the panel, and the transverse drive conductor on the other side. The larger amplitude transverse field $H_{T1}$ was chosen to be equal to or greater than $H_{K2}$; the smaller amplitude transverse field $H_{T2}$ was chosen to be approximately equal to $H_{K1}$. The currents in the various conductors are dependent upon the parameters of the magnetic material of which the storage element is composed, and their amplitudes will also depend upon the width of the conductors, and the spacing between themselves and the element. It should be emphasized that the foregoing dimensions and amplitudes given for the embodiment described, may vary according to the material, design or application, and are included solely for purposes of example.

Figure 2:
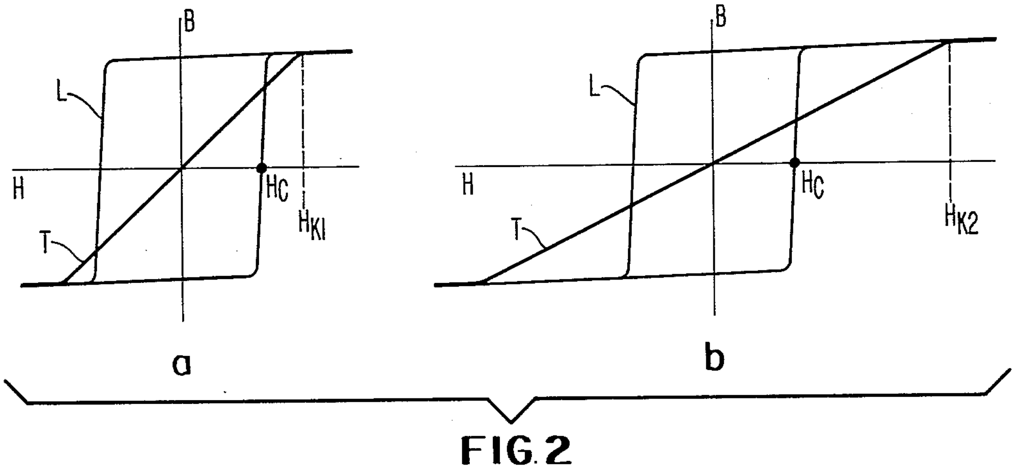

FIGS. 2*a* and 2*b* display the relative differences in the magnetic parameters of coercivity and anisotrophy field for the magnetic material of which the ferromagnetic element of the present invention is composed. Each of the figures illustrates typical B-H curves for the magnetic film material—a substantially rectangular loop designated L, characteristic of the film in the longitudinal or preferred direction of magnetization, and a linear loop T, for the film in the transverse or hard direction. Based upon the characteristics of the materials represented respectively by FIGS. 2*a* and 2*b*, it is observed that the coercive force in the preferred direction, $H_C$, for both films is substantially the same. However, the saturation magnetization force in the hard direction, referred to as the anisotropy field, varies considerably—the value of $H_{K2}$ of FIG. 2*b* being approximately twice that of $H_{K1}$ of FIG. 2*a*.

The production of magnetic material with controlled values of anisotropy may be accomplished by several methods. One such method which has been successfully employed in the fabrication of the ferromagnetic element described herein utilizes the angle-of-incidence effect. This effect on anisotropy is due to the angle of incidence between the substrate and the vapor beam depositing the magnetic material.

If material of the same composition is deposited from two sources onto a substrate, which is maintained at the same conditions during such depositions, the material deposited at a greater angle of incidence will have a higher value of anisotropy than that deposited by a vapor beam normal to the substrate. The deposition takes place under the influence of a suitable magnetic field to establish a uniaxial axis of anisotropy in the magnetic film.

The value of anisotropy field is also a function of the substrate temperature during deposition and care must be taken that this temperature does not exceed a so-called critical value, at which temperature, the angle-of-incidence effect no longer affects the value of the anisotropy field.

Another method of producing magnetic material of different anisotropy also utilizes the angle-of-incidence effect. In this method a material such as aluminum is evaporated onto preselected areas of a heated glass substrate at an oblique angle of incidence. The aluminum deposit is then coated with a vacuum deposited insulator. Finally, the magnetic material is evaporated onto the insulator while under the influence of a suitable magnetic orienting field.

The evaporation of aluminum and other suitable materials at an oblique angle of incidence causes the surface of the deposited material to assume a definite geometrical arrangement. This arrangement causes oriented crystallite chains to be formed. The magnetic material deposited over the aluminum exhibits a high value of anisotropy field due to the geometrical arrangement of the surface. Magnetic material evaporated at normal incidence onto the smooth surface of the insulator-coated glass substrate has a much lower value of anisotropy field.

It should be noted that any preparation of the substrate to achieve the aforementioned type of geometry before the magnetic material is deposited will result in similar anisotropic effects. Other factors are known to influence the value of the anisotropy field, as for example, the composition of the material itself and anisotropic strain.

The methods of controlling the anisotropy of magnetic films mentioned hereinbefore have been included by way of example as being of general interest, and are not to be construed as limitative of the manner in which the magnetic film element of the present invention is to be formed.

Figure 3:
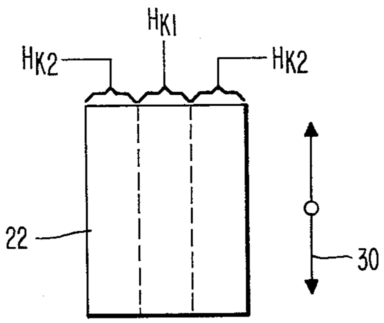

FIG. 3 represents a preferred but not necessarily optimum arrangement of the material comprising the magnetic element 22 depicted in FIG. 1. As illustrated in FIG. 3, the central region of the element consists of material of lower anisotropy, $H_{K1}$, while the adjacent regions consist of the higher anistropy, $H_{K2}$, material. The direction of the preferred axis of magnetization is as indicated by the arrows 30.

The pictorial representation of FIG. 1, that is, of magnetic film 22 and its associated conductors 24, 26 and 28 will now be considered in connection with the remaining figures to describe in detail the principles of the invention.

The large rectangles of FIGS. 4, 5, 7 and 8 represent a ferromagnetic storage element, such as element 22 of FIG. 1. The arrows within the rectangles are representative of the orientation of the magnetic dipoles in the immediate vicinity of the arrows. As such the arrows illustrate the direction of magnetization, which in each of the figures is toward the positive state (+) when the arrow points upward, and toward the negative state (−) when the arrow points downward. In general, arrows of different lengths, as for example in FIG. 4*c*, have been used to differentiate the values of anisotropy field. The shorter arrows designate magnetic material of $H_{K1}$ anisotropy; the longer arrows, $H_{K2}$ material. The preferred direction of magnetization is assumed to be vertical in each of the rectangles, and lying in the plane of the paper. Arrows pointing in a direction transverse or nearly transverse to the preferred direction represent a transitional, unstable state. The narrow rectangles within the larger rectangles, separated by solid lines, are representative of domains—the direction of the arrow within the domain indicating the state thereof. For convenience, areas magnetized in the positive state have been shaded, while unstable conditions or areas magnetized in the negative state remain unshaded.

The field diagrams of FIGS. 4*d*, 5*d*, 7*d* and 8*d* are included to further facilitate an understanding of the invention, by indicating vectorially the direction of the various fields, both internal and external, which affect the magnetization of the ferromagnetic element. Due to the great difference in the field strengths which are employed in the practice of the invention, it was considered impractical to illustrate the fields to scale. Therefore the reader is cautioned that the diagrams are valid only insofar as direction or polarity of field is concerned.

Figure 4:
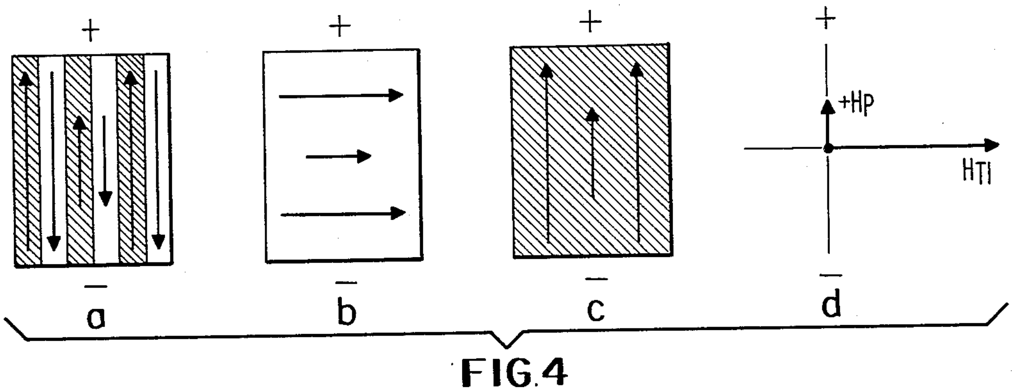
Figure 5:
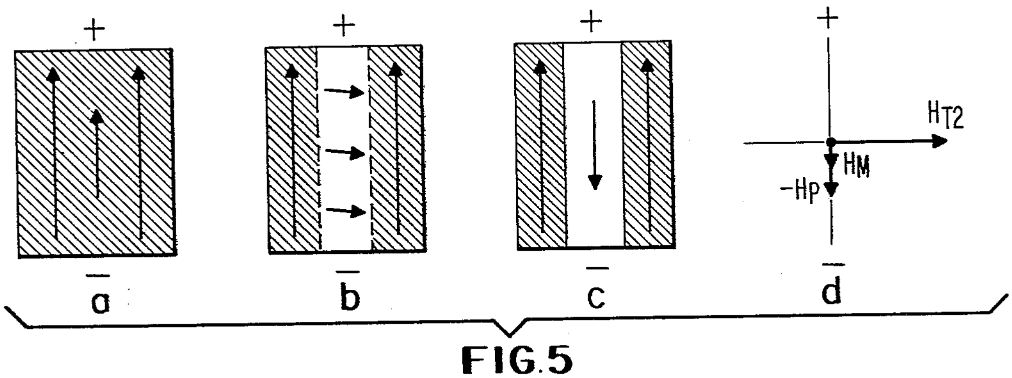
Figure 6:
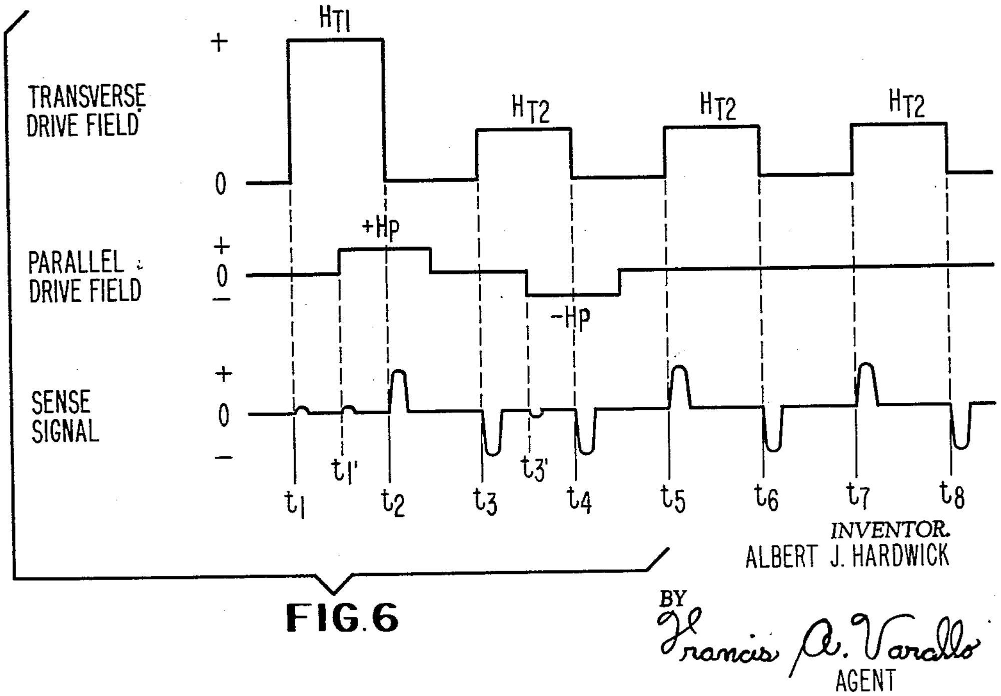

FIGS. 4 and 5 will now be considered in connection with the pulse diagram of FIG. 6. FIG. 4*a* represents a demagnetized ferromagnetic element, with domains alternately residing in the positive and negative states. It will be assumed that it is desired to cause the element of FIG. 4*a* to be magnetized in the positive state and thence to form within the element a non-destructive domain pattern which will arbitrarily represent the storage of a binary "1." If a strong transverse drive field $H_{T1}$ equal to or larger than $H_{K2}$, as illustrated in FIG. 6, is applied to the element of FIG. 4*a* at time $t_1$ (such as by current flowing from top to bottom through conductor 24 over the top of element 22, in FIG. 1) a wide region of magnetic dipoles are rotated toward 90 degrees as illustrated in FIG. 4*b*. The direction of the $H_{T1}$ field is indicated in FIG. 4*d*. At time $t_1$, a second comparatively weak parallel field $+H_P$ is applied to the magnetic element of FIG. 4*b*. This field is one which would be produced by current flow from left to right through conductor 26 over the top of element 22, and is indicated as having a positive direction in FIG. 4*d*. At time $t_2$, $H_{T1}$ terminates and substantially all of the magnetic dipoles acting as a single large domain rotate to the positive state as indicated in FIG. 4*c*. Thus substantially between times $t_1$ and $t_2$ a positive locking domain has been formed. The flux changes created by the rotation of the magnetic dipoles when the fields are applied or removed result in sense signals being induced in a sense conductor such as conductor 28 of FIG. 1. These sense signals are illustrated in FIG. 6.

Next, at time $t_3$ in order to form a negative central domain, a weaker transverse field $H_{T2}$ of amplitude approximately equal to $H_{K1}$ is applied to the magnetic element of FIG. 5*a*, and the magnetic dipoles in the region of $H_{K1}$ material are rotated in a clockwise direction to an angle slightly greater than 90 degrees. As described hereinbefore, a demagnetizing field designated $H_M$ in FIG. 5*d* acts in a direction to cause the dipoles to rotate past 90 degrees toward the negative state. If at this time $H_{T2}$ is removed, the demagnetizing field $H_M$ would be effective in rotating the $H_{K1}$ region of the element to the negative state.

It has been found that the application of a negative parallel drive field $-H_P$ (again utilizing conductor 26 with current flow from right to left across the top of element 22), which acts in the same direction as $H_M$ facilitates the formation of this central domain. Accordingly at time $t_3$, $-H_P$ is applied to the element, and upon the removal of $H_{T2}$ at time $t_4$, the dipoles in a central region rotate to the negative state, as shown in FIG. 5*c*. The field $-H_P$ is no longer required and is removed. Thus a central domain of negative state has been formed, substantially during the time period $t_3$–$t_4$. The entire operation of writing a binary "1" into the element took place during the period $t_1$–$t_4$.

Successive read-outs or interrogations of the magnetic element are illustrated as occurring during the period $t_5$–$t_8$, and are accomplished by the application of successive $H_{T2}$ fields. Each time $H_{T2}$ is applied to the element, for example at times $t_5$ and $t_7$, the dipoles in the central region will rotate counterclockwise toward 90 degrees and produce a positive sense signal. The dipoles in the locking domains of $H_{K2}$ material are substantially unaffected by the $H_{T2}$ field. The demagnetizing field from the positive state locking domain exerts a force on the dipoles, deflecting them toward the negative state. When $H_{T2}$ is removed, such as at times $t_6$ and $t_8$, the dipoles fall back to the negative state. The dipoles in the central region always return to their initial state regardless of the number of times that they are interrogated by an $H_{T2}$ pulse. The appearance of a positive pulse followed by a negative pulse on the sense wire can be interpreted as a readout of a binary "1." In some applications the positive pulse only would be useful to the utilization device while the negative pulse would be extraneous and perhaps troublesome. In these applications suitable gating means, a variety of which are well known in the electronics art, can be used to gate out the negative pulses.

Figure 7:
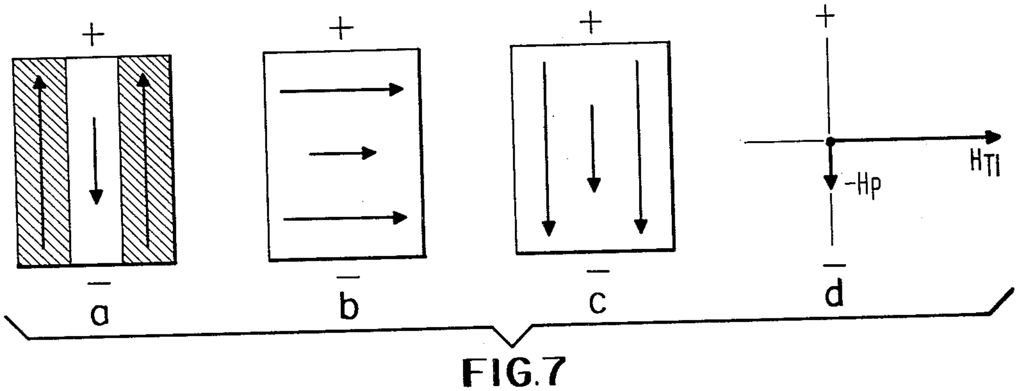
Figure 8:
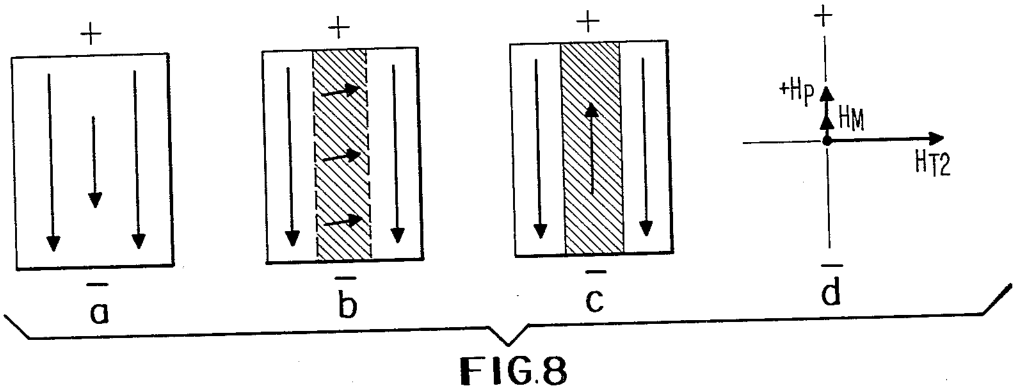
Figure 9:
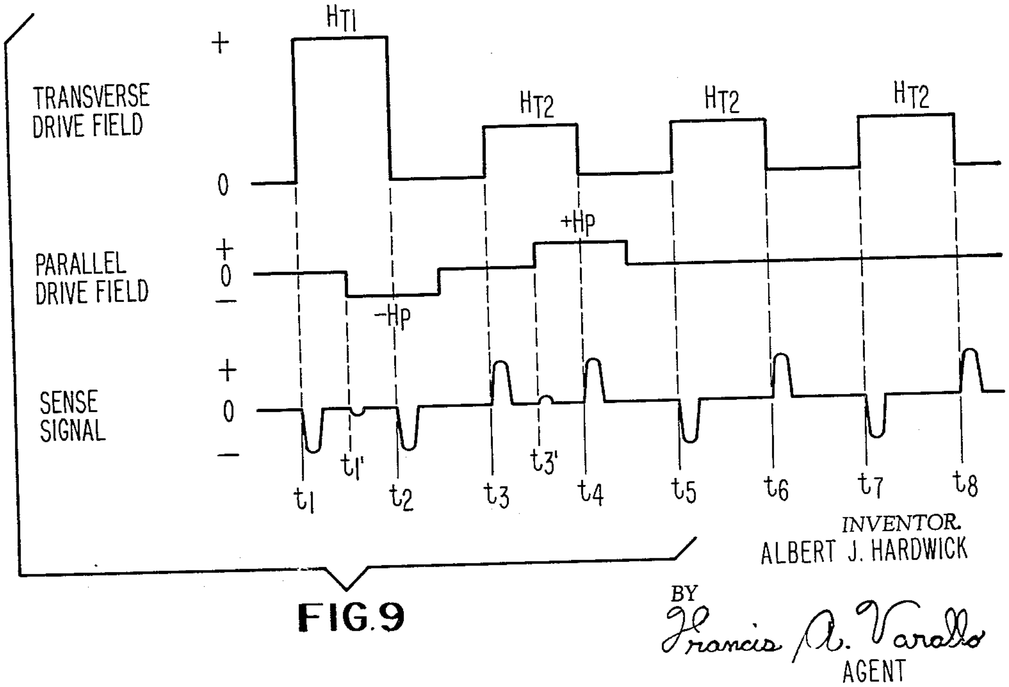
FIG. 9 is a diagram depicting a sequence of fields applied to a thin film element and the corresponding induced voltages generated in the sense conductor for writing in and reading out information arbitrarily representative of a binary "0"

A consideration of FIGS. 7 and 8 will be made in connection with the pulse diagram of FIG. 9. FIG. 7*a* represents a ferromagnetic element with central domain of negative state and locking domain of positive state. It will be assumed that it is desired to cause the element of FIG. 7*a* to be magnetized in the negative state and thence to form within the element a non-destructive domain pattern which will arbitrarily represent the storage of a binary "0." A strong transverse drive field, $H_{T1}$, as illustrated in FIG. 9, is applied to the element of FIG. 7*a* at $t_1$ time. This field causes a wide range of magnetic dipoles to rotate toward 90 degrees as illustrated in FIG. 7*b*. The direction of the $H_{T1}$ field is indicated in FIG. 7*d*. At time $t_1$, parallel field $-H_P$ is applied to the magnetic element of FIG. 7*b*. This field is one which would be produced by current flow from right to left through conductor 26 over the top of element 22, and is indicated as having a negative direction in FIG. 7*b*. At time $t_2$, $H_{T1}$ is removed and substantially all of the magnetic dipoles acting as a single large domain rotate to the negative state, as shown in FIG. 7*c*. Between the times $t_1$ and $t_2$ a negative locking domain has been formed. Voltages induced in the sense wire are illustrated as the sense signals in FIG. 9.

At time $t_3$ in order to form a positive central domain, a transverse field $H_{T2}$ is applied to the magnetic element of FIG. 8*a*, and the magnetic dipoles in the $H_{K1}$ region are rotated in a counterclockwise direction to an angle slightly greater than 90 degrees. A demagnetizing field designated $H_M$ in FIG. 8*d*, acts in a positive direction to cause the dipoles to rotate past 90 degrees toward the positive state. Here again if $H_{T2}$ is removed, the demagnetizing field $H_M$ would be effective in rotating the $H_{K1}$ region of the element to the positive state. However, to facilitate the formation of a positive central domain, a positive parallel drive field, $+H_P$, (such as would be obtained with current flowing from left to right in conductor 26 across the top of element 22), which acts in the same direction as $H_M$ is applied to the element of FIG. 8*b*. Accordingly, at time $t_{3'}$, $+H_P$ is applied to the element, and upon the termination of $H_{T2}$ at time $t_4$, the dipoles in a central region rotate in a counterclockwise direction to the positive state as shown in FIG. 8*c*. The field $+H_P$ is no longer required and is terminated. By this operation a central domain of positive state has been formed, substantially during the period $t_3$–$t_4$. The operation of writing a binary "0" into the element of FIG. 7*a* took place during the period $t_1$–$t_4$.

During the period $t_5$–$t_8$ the magnetic element of FIG. 8*c* is interrogated twice by application of successive $H_{T2}$ fields. Each time the $H_{T2}$ field is applied to the element, for example at times $t_5$–$t_7$, the dipoles in the central region rotate clockwise toward 90 degrees and produce a negative sense signal. The dipoles in the negative locking domains are substantially unaffected by the $H_{T2}$ field. The demagnetizing field from the locking domain exerts a force on the dipoles which deflects them toward the positive state. When $H_{T2}$ is removed, as at times $t_6$ and $t_8$, the dipoles fall back to the positive state. It has been observed that the dipoles in the central domain always return to their initial state regardless of the number of times that they are interrogated by an $H_{T2}$ pulse. The occurrence of a negative pulse followed by a positive one, as observed on the sense wire can be interpreted as a read-out of a binary "0." If the positive pulse is objectionable it may be gated out in a manner well known to those skilled in the electronics art.

Figure 10:
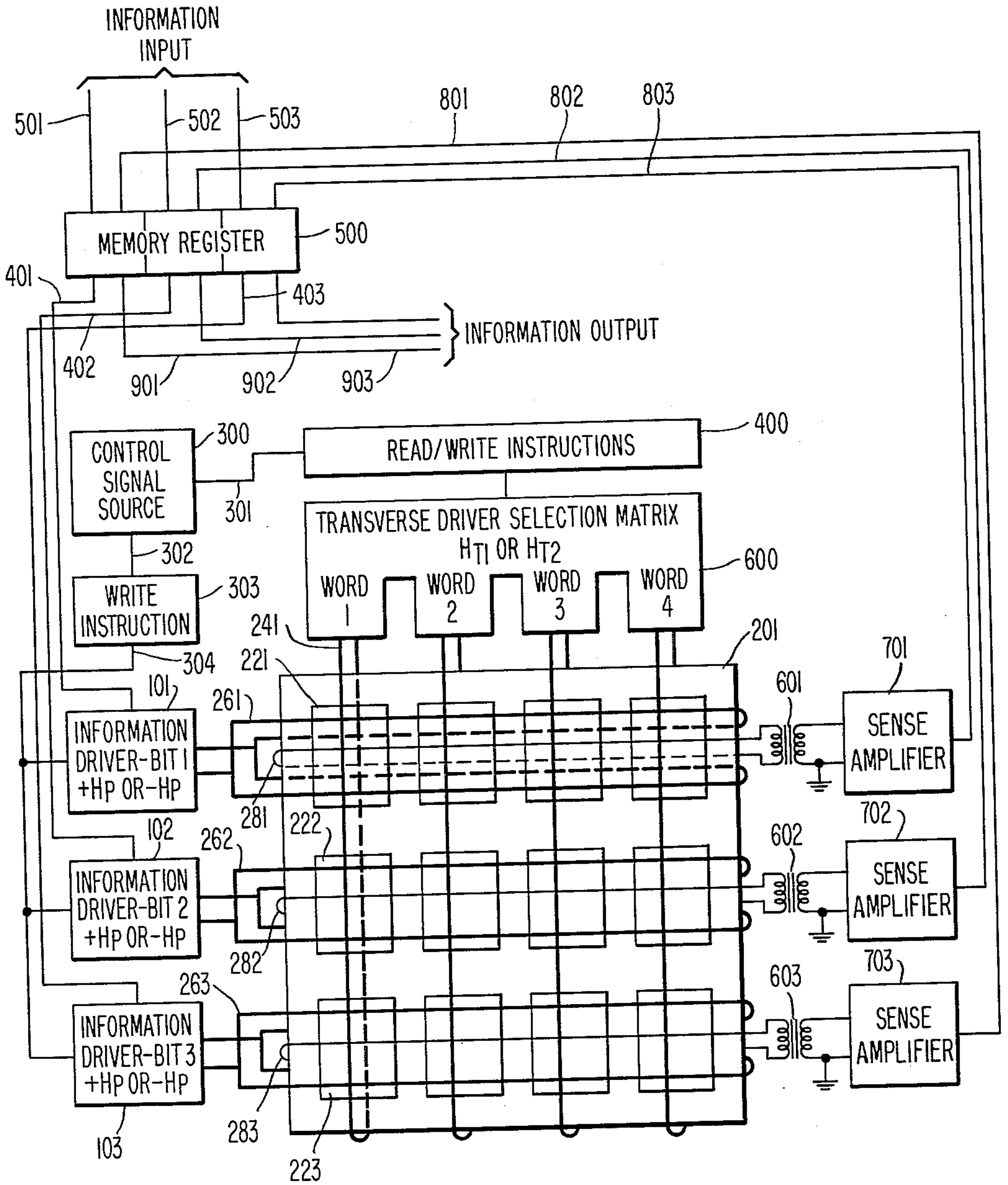
FIG. 10 is a representation of ferromagnetic storage elements with associated conductors and auxiliary equipment arranged for illustrating the utilization of the invention.

FIG. 10 depicts twelve film elements with conductor assemblies similar to the one assembly shown in FIG. 1, and auxiliary equipment connected to illustrate the use of the present invention as a data store. Only the elements in the first word have been numbered respectively 221, 222 and 223, since a consideration of these elements will suffice in the explanation of the operation of the memory array of FIG. 10. Likewise only the transverse drive conductor for "word 1" has been designated by a reference numeral, namely 241. The parallel drive conductors associated with the "information drivers" for bits 1, 2 and 3 are designated respectively 261, 262 and 263; the sense conductors for each of the bits are designated 281, for "bit 1," 282 for "bit 2" and 283 for "bit 3." As the reader has probably noted, the first two numbers of each of the items, both magnetic elements and conductors in FIG. 10, have been chosen to correspond with like items in FIG. 1, the third number being indicative of their position in the array. The preferred direction of each of the elements in the array is vertical and lies within the plane of the paper.

The transverse drive conductor 241, and the parallel drive and sense conductors, 261, 281, respectively, are shown as returning to their sources by traversing the underside of the base or substrate 201. It should be understood that, although not shown in such detail, all of the other conductors are assumed to return in like manner.

Each pair of sense conductors is connected to a transformer, or differential amplifier, in order to reject common-mode noise signals. Thus sense wires 281, 282 and 283 are connected respectively to the primary windings of transformers 601, 602 and 603. The secondaries of the transformers are each connected respectively to sense amplifiers, 701, 702 or 703.

In electrical computing and data processing apparatus, it is conventional to achieve economy of apparatus by causing the same physical assemblies to perform functions as part of different logical entities at different times. For simplicity of explanation, rectangles or blocks are employed to represent assemblies of apparatus to perform specified electrical or logical operations. Various conventional methods and apparatus for performing these functions are well known to those skilled in the electronics art, particularly the electronic computer field.

Block 300 represents a source of control signals, which are applied selectively by channels represented as single lines, although they may be multiple conductors in some or all of the cases, by way of line 301 to a source of read-write instructions 400 and by way of line 302 to a source of write instruction 303. The control signal source 300 will perform its directive or function in accordance with the logical requirements of the over-all operation to be performed by the computing or analogous system which is to employ the present invention as a memory. The functions of the control signal source 300 will be specified only insofar as they relate to the practice of the present invention.

Assume that it is desired to record or write information into the memory and that such information has been stored in the memory register 500. The register 500 serves as a buffer between the input of information into the memory and output of information from the memory. As depicted in FIG. 10, the memory register 500 is shown as comprising three stages, i.e., it is capable of storing at any one time three bits of data. Information may enter the register from somewhere in the computer logic circuits or from a source external to the computer by way of lines 501, 502 and 503. Similarly, the information stored in the register at any time is available for use in such logic circuits or by an external utilization device by way of lines 901, 902 and 903.

It will be further assumed that the information to be written into the memory is the binary number "101," and that it is to be written into the memory as "word 1." The control signal source 300 applies by way of line 301 two command pulses to the read/write instructions block 400 in order to implement the write cycle, together with a third pulse representative of the address instruction. The transverse driver selection matrix 600 which, depending upon the particular application, may include either a diode, transformer or transistor matrix which are well known in the computer field, senses the address which is stored in the read-write instructions block 400. Selection of a desired word may be had by coincidence of a driver and a switch. The switch will clamp one terminal of the selection matrix to a predetermined supply potential and the circuit is completed when the proper driver is enabled.

In the present example, the selection matrix 600 selects the driver and switch associated with "word 1" in order that the bits of information stored in the memory register 500 can be written respectively into the three storage elements 221, 222 and 223.

Reference to FIG. 6 will indicate the timing sequence for the application of fields to the storage elements for writing and reading a binary "1"; and FIG. 9 will give similar information for writing and reading a binary "0."

Using the same time notation as FIGS. 6 and 9, at time $t_1$, the driver selection matrix 600 senses the first half of the write instruction from the instructions block 400 and causes a high level transverse drive current to flow through conductor 241, thereby generating the $H_{T1}$ field which is applied to the magnetic elements. At a later time $t_{1'}$, the control source 300 pulses the write instruction block 303 by way of line 302. Each of the information drivers 101, 102 and 103 constantly sense the information in their respective bit positions in the memory register 500 by means of lines 401, 402 and 403. The reception of a pulse by the write instruction block 303 from the control signal source 300, directs by way of a signal on line 304 all of the drivers to write simultaneously. If the particular driver senses a "1" in the memory register to be written into the memory, this driver will supply a positive pulse at time $t_{1'}$, for generating the $+H_P$ field, followed by a negative pulse, to generate the $-H_P$ field at a later time, such as $t_{3'}$, as in FIG. 4. On the other hand, if a driver senses a "0" it will supply a negative pulse for $-H_P$ at $t_{1'}$, and a positive pulse for $+H_P$ at $t_{3'}$ time, as in FIG. 7.

In the present example, the information driver 101 for bit 1 will apply a positive pulse of current, to generate $+H_P$, to the parallel drive conductor 261, at time $t_{1'}$; driver 102 will apply a negative pulse, for $-H_P$, to conductor 262; driver 103, a positive pulse to conductor 263.

At time $t_2$ the transverse driver selection matrix 600 terminates the high level transverse current, and shortly afterward the information driver pulses terminate.

At time $t_3$, the selection matrix 600 senses the instruction for the second half of the write cycle from the read/write instructions block 400, and the transverse driver applies along conductor 241 a low level current, to generate $H_{T2}$.

At time $t_{3''}$ the information drivers 101, 102 and 103 respectively cause a $-H_P$, $+H_P$ and $-H_P$ field to be applied respectively to elements 221, 222 and 223.

At time $t_4$ the selection matrix 600 terminates the low level transverse current, and shortly afterward the information driver pulses terminate. The writing cycle is now complete—"word 1" of the memory now stores a "1" as bit 1, "0" for bit 2, and "1" for bit 3.

To read the information out of the memory, the control source 300 sends two commands to the read-write instructions block 400, one for the address, the other to read. Assuming that the address is still for "word 1," the transverse driver selection matrix 600 senses the instructions stored in block 400, and causes low level current to flow through drive conductor 241, in order to produce the $H_{T2}$ field, and the information in magnetic elements 221, 222 and 223 is read out nondestructively as hereinbefore described in connection with FIGS. 3 and 6.

As a result of the reading operation, a positive pulse followed by a negative one will appear on each of sense lines 281 and 283 and a negative pulse followed by a positive pulse will appear on sense wire 282. The signals on sense lines 281, 282 and 283 are coupled respectively by transformers 601, 602 and 603 into sense amplifiers 701, 702 and 703. It is assumed that the sense amplifiers contain suitable gating circuits to gate out the undesired polarity signals induced in the sense wires. The outputs of the sense amplifiers are fed in parallel to the appropriate locations in the memory register 500 by way of lines 801, 802 and 803, where the information is stored and may be utilized by either the computer logic circuits or an external utilization device.

Information may now be written into "word 2" and "word 3" of the memory by presetting the desired information in the memory register and initiating the write instructions as hereinbefore described. New information may also be written into "word 1" in the same manner, in which case the information stored by the previous write cycle is destroyed by the new write cycle. As new information is stored in the memory register 500 by either the computer logic circuits or the sense amplifiers, the information previously stored therein is destroyed and only the new information remains.

Since components of magnetizing fields may be added to produce a resultant different from either component in direction and magnitude, it is obvious in the light of the art that combinations of current-carrying conductors, or other sources of magnetizing fields, different from those here employed to teach the basic principles of nondestructively reading the content of very fast magnetic data stores, may be applied. Modifications of the arrangements described herein may be required to fit particular operating requirements. These will be apparent to those skilled in the art. The invention is not considered limited to the embodiments chosen for purposes of disclosure and covers all changes and modifications which do not constitute departures from the true spirit and scope of this invention. Accordingly, all such variations as are in accord with the principles discussed previously are meant to fall within the scope of the appended claims.

What is claimed is:

1. A magnetic device of the character described comprising ferromagnetic material and being capable of assuming opposed states of residual flux density along a preferred axis of magnetization, said magnetic device comprising a plurality of distinct regions of said ferromagnetic material so arranged that adjacent ones of said regions possess different absolute values of anisotropy field.

2. A magnetic device of the character described comprising ferromagnetic material and being capable of assuming opposed states of residual flux density along a preferred axis of magnetization, said magnetic device comprising a plurality of distinct regions of said ferromagnetic material including at least one of said regions having a lesser absolute value of anisotropy field than that of other of said regions situated adjacent thereto.

3. A magnetic device of the character described comprising ferromagnetic material and being capable of assuming opposed states of residual flux density along a preferred axis of magnetization, said magnetic device comprising a plurality of distinct regions of said ferromagnetic material including a central region having a lesser absolute value of anisotropy field than that of other of said regions which are contiguous with said central region along borders thereof which lie substantially parallel to said preferred axis.

4. A data store comprising at least one ferromagnetic storage element capable of assuming opposed states of residual flux density along a preferred axis of magnetization, said element comprising a plurality of distinct regions of ferromagnetic material including a first type region having a lesser absolute value of anisotropy field than that of second type regions of magnetic material adjacent thereto, first means for magnetizing said element substantially in a predetermined one of said states, said element acting substantially as a single large domain of said predetermined state, second means for magnetizing said first type region of ferromagnetic material to a position nearly transverse to said preferred direction, the magnetization of said second type regions of said predetermined state being substantially unaffected by said second means, the demagnetizing forces present in said second type regions being effective upon the termination of said second means to cause said first type region to assume a state of residual flux density opposite to said predetermined state.

5. A data store as defined in claim 4, wherein said ferromagnetic storage element is a thin film of ferromagnetic alloy having a thickness of not more than 5000 Angstrom units.

6. A data store comprising at least one ferromagnetic storage element capable of assuming opposed states of residual flux density along a preferred axis of magnetization, said element comprising a plurality of distinct regions of ferromagnetic material including a central region having a lesser absolute value of anisotropy field than that of neighboring regions which are contiguous with said central region, first means for applying magnetic fields to said element to cause substantially all of the magnetic dipoles of said element to rotate to a predetermined one of said states, said element acting substantially as a single large domain of said predetermined state, second means for applying a magnetizing field to said element whereby only the magnetic dipoles in said central region are rotated to a magnetically unstable state, the magnetization of said neighboring regions of said predetermined state being substantially unaffected by said second means, the demagnetizing fields originating from the dipoles within said neighboring regions being effective upon the termination of said second means to cause the dipoles in said central region to assume the state opposite to said predetermined state, said central region constituting a domain of one state bordered by neighboring regions constituting domains of opposite state.

7. A data store comprising at least one ferromagnetic storage element capable of assuming opposed states of residual flux density along a preferred axis of magnetization, said element comprising a plurality of distinct regions of ferromagnetic material including a central region having a lesser absolute value of anisotropy field than that of other of said regions which are contiguous with said central region along borders thereof which lie substantially parallel to said preferred axis, means for applying concurrently to said magnetic element a first magnetizing field transverse to said preferred axis and a second magnetizing field parallel to said preferred axis to cause substantially all of the magnetic dipoles of said element to rotate to a predetermined one of said states, said element acting substantially as a single large domain of said predetermined state, means for applying to said element a third magnetizing field transverse to said preferred axis whereby only the magnetic dipoles in said central region are rotated to a magnetically unstable position, the magnetization of said other regions of said predetermined state being substantially unaffected by the rotation of magnetization of said central region, the demagnetizing fields originating from the dipoles within said other regions being effective upon the termination of said third magnetizing field to cause the dipoles in said central region to rotate to the state opposite to said predetermined state, said central region constituting a domain of one state bordered by said other regions constituting domains of opposite state.

8. A data store as defined in claim 7 wherein said means for applying a magnetizing field transverse to said preferred axis and a magnetizing field parallel to said preferred axis, each including an electrical conductor adjacent to but not geometrically linked to said ferromagnetic storage element, and means operatively connected to said electrical conductors for selectively driving current therethrough.

9. A data store comprising at least one ferromagnetic storage element capable of assuming opposed states of residual flux density along a preferred axis of magnetization, said element comprising a plurality of distinct sections of ferromagnetic material including a central section having a lesser absolute value of anisotropy field than that of neighboring sections which are contiguous with said central section along borders thereof which lie substantially parallel to said preferred axis; means for applying concurrently to said magnetic element a first transverse magnetizing field of value equal to or greater than the anisotropy field of said neighboring sections, and a second parallel magnetizing field to cause substantially all of the magnetic dipoles of said element to rotate to a predetermined one of said states; said element acting substantially as a large locking domain of said predetermined state; means for applying to said element a third transverse magnetizing field of value similar to that of the anisotropy field of said central section whereby the magnetic dipoles in said central section are rotated to a magnetically unstable position, the magnetization of said neighboring sections of said predetermined state being substantially unaffected by said third magnetizing field, the demagnetizing fields originating from the dipoles within said neighboring sections being effective upon the termination of said third magnetizing field to cause the dipoles in said central section to rotate to the state opposite to said predetermined state, said central section constituting a central domain of one state bordered by neighboring sections constituting neighboring domains of opposite state; and means for interrogating the state of said central domain.

10. A data store as defined in claim 9 wherein said means for interrogating the state of said central domain includes means for applying to said element a fourth transverse magnetizing field similar in character to said third transverse magnetizing field for causing the magnetic dipoles in said central domain to rotate toward a direction transverse to said preferred axis, the orientation of the magnetic dipoles of said neighboring domains being substantially unaffected by said fourth transverse magnetizing field.

11. A data store comprising at least one ferromagnetic storage element capable of assuming opposed states of residual flux density along a preferred axis of magnetization, said element comprising a plurality of distinct sections of ferromagnetic material including a central section having a lesser absolute value of anisotropy field than that of neighboring sections which are contiguous with said central section along borders thereof which lie substantially parallel to said preferred axis; means for applying concurrently to said magnetic element a first transverse magnetizing field of value equal to or greater than the anisotropy field of said neighboring sections, and a first parallel magnetizing field to cause substantially all of the magnetic dipoles of said element to rotate to a predetermined one of said states; said element acting substantially as a large locking domain of said predetermined state; means for applying to said element a second transverse magnetizing field of value similar to that of the anisotropy field of said central section whereby the magnetic dipoles in said central section are rotated to a magnetically unstable state, the magnetization of said neighboring sections of said predetermined state being substantially unaffected by said second transverse field, the demagnetizing fields originating from the dipoles within said neighboring sections tending to cause the dipoles in said central section to rotate to the state opposite to said predetermined state; means for applying to said magnetic element a second parallel magnetizing field in concurrence with said second transverse magnetizing field, said second parallel field acting in the same direction as said demagnetizing fields and tending upon the termination of said second transverse field to facilitate the rotation of the magnetic dipoles in said central section to the state opposite to said predetermined state, said central section constituting a central domain of one state bordered by neighboring sections constituting domains of opposite state; and means for interrogating the state of said central domain.

12. A data store comprising at least one ferromagnetic storage element capable of assuming opposed states of residual flux density along a preferred axis of magnetization, said element compring a plurality of distinct sections of ferromagnetic material including a central section having a lesser absolute value of anisotropy field than of neighboring sections which are contiguous with said central section along borders thereof which lie substantially parallel to said preferred axis; means for applying concurrently to said magnetic element a first transverse magnetizing field of value equal to or greater than the anisotropy field of said neighboring sections, and a first parallel magnetizing field to cause substantially all of the magnetic dipoles of said element to rotate to a first of said states; said element acting substantially as a large locking domain of said first state; means for applying to said element a second transverse magnetizing field of value approximately equal to that of the anisotropy field of said central section whereby the magnetic dipoles in said central section are rotated to a magnetically unstable state, the magnetization of said neighboring sections of said first state being substantially unaffected by said second transverse field, the demagnetizing fields originating from the dipoles within said neighboring sections tending to cause the dipoles in said central section to rotate to the second of said states; means for applying to said magnetic element a second parallel magnetizing field concurrent with said second transverse magnetizing field, said second parallel field acting in the same direction as said demagnetizing fields and tending upon the termination of said second transverse field to facilitate the rotation of magnetic dipoles in said central section to said second state, said central section constituting a central domain of second state bordered by neighboring sections constituting neighboring domains of first state; means for interrogating the state of said central domain including means for applying to said magnetic element a third transverse magnetizing field similar in character to said second transverse magnetizing field for causing the magnetic dipoles in said central domain to rotate toward a direction substantially transverse to said preferred axis; means for sensing said rotation, the orientation of the magnetic dipoles in said neighboring domains being substantially unaffected by said third transverse field, the demagnetizing fields originating within said neighboring domains being effective upon the termination of said third transverse field to cause the dipoles in said central domain to rotate back to said second state.

13. A data store as defined in claim 12, wherein said ferromagnetic storage element is a thin film of ferromagnetic alloy having a thickness of not more than 5000 Angstrom units.

14. A data store comprising, a storage element in the form of a magnetically bistable thin film disposed in a single plane and having a preferred direction of magnetization substantially the same everywhere in the element and substantially parallel to the plane thereof, said element comprising a plurality of distinct regions of ferromagnetic material including a central region having a lesser absolute value of anisotropy field than that of neighboring regions which are contiguous with said central region along borders thereof which lie substantially parallel to said preferred direction, transverse drive conductor means adjacent to said element and extending in a parallel plane thereof and being positioned parallel to said preferred direction, parallel drive conductor means adjacent to said element and extending in a parallel plane thereacross and being positioned at right angles to said preferred direction, means causing current flow through said transverse drive conductor means so as to produce a first transverse magnetizing field of value equal to or greater than the anisotropy field of said neighboring sections, means for causing current flow through said parallel drive conductor means so as to produce a first parallel magnetizing field, said first transverse field and said first parallel field being applied concurrently to said storage element and being operable to rotate the direction of magnetization of substantially the entirety of said magnetic element to a predetermined stable state, said storage element acting substantially as a large locking domain of said predetermined state, means for causing current flow through said transverse drive conductor means for producing a second transverse magnetizing field of value approximately equal to that of the anisotropy field of said central section whereby the direction of magnetization of said central region is rotated to a magnetically unstable position, the magnetization of said neighboring sections of said predetermined state being substantially unaffected by said second transverse magnetizing field, the demagnetizing fields originating from the dipoles within said neighboring regions tending to cause the direction of magnetization of said central region to rotate to the state opposite to said predetermined state, means for causing current flow through said parallel drive conductor means to produce a second parallel magnetizing field which acts in the same direction as said demagnetizing fields, said second parallel field being applied concurrently with said second transverse field and tending upon the termination of said second transverse field to facilitate the rotation of the direction of magnetization of said central region to the state opposite to said predetermined state, said central region constituting a central domain of one state bordered by neighboring sections constituting neighboring domains of opposite state, and means for reading the state of said central domain.

15. A data store as defined in claim 14, wherein said means for reading the state of said central domain comprises means for causing current flow through said transverse drive conductor means to produce a third transverse magnetizing field similar in character to said second transverse magnetizing field, said third transverse magnetizing field being applied to said magnetic element for causing the direction of magnetization of said central domain to rotate toward a direction substantially transverse to said preferred axis, means for sensing said latter rotation of magnetization, the direction of magnetization of said neighboring domains being substantially unaffected by said third transverse field, the demagnetizing fields originating within said neighboring domains being effective upon the termination of said third transverse field to cause the direction of magnetization of said central domain to rotate back to said second state.

16. A data store as defined in claim 15, wherein said means for sensing said rotation of the direction of magnetization during the readout of the central domain comprises a sense conductor adjacent to said magnetic element and extending in a parallel plane thereacross and at right angles to said preferred direction of magnetization.

17. A data store comprising a plurality of thin ferromagnetic storage elements arranged in rows and columns, said elements being capable of attaining opposed states of residual flux density along a preferred axis of magnetization, each of said elements comprising a plurality of distinct sections of ferromagnetic material including a central section having a lesser absolute value of anisotropy field than that of neighboring sections which are contiguous with said central section along borders thereof which lie substantially parallel to said preferred axis, a column-driving conductor for each column inductively coupled to all of the storage elements in the column and substantially aligned with said preferred axis of magnetization, a row-driving conductor for each row inductively coupled to all of the storage elements in the row and substantially oriented at right angles to said preferred axis of magnetization, means for applying driving currents concurrently to the column conductor of a selected column so as to apply a first transverse magnetizing field to all of the storage elements in said selected column, and to each row conductor for applying a first parallel magnetizing field of predetermined polarity to all of the elements coupled thereto, said first transverse magnetizing field having a magnitude equal to or greater than the absolute value of the anisotropy field of the neighboring sections of each of said storage elements, substantially all of the magnetic dipoles of each of the storage elements in said selected column being rotated to a predetermined state in accordance with the polarity of said first parallel magnetizing field, each of said elements in said selected column constituting a large locking domain of said predetermined state, means including said column conductor of said selected column for applying a second transverse magnetizing field to each of the storage elements in said selected column, said second transverse magnetizing field being of a magnitude approximately equal to the absolute value of the anisotropy field of the central section of each of said storage elements, the direction of magnetization of the central section of each of the elements in said selected column being rotated to a magnetically unstable position in response to said second transverse field, the magnetization of said neighboring sections of said predetermined state being substantially unaffected by said second transverse field, the demagnetizing fields originating from the dipoles within said neighboring sections tending to cause the direction of magnetization of said central sections to rotate to the states opposite to said predetermined states, said central sections constituting central domains of one state bordered by neighboring sections constituting neighboring domains of opposite state.

18. A data store as defined in claim 17 including means for interrogating the state of said central domain comprising a plurality of sense conductors inductively coupled to respective rows of said storage elements and oriented at right angles to said preferred axis of magnetization, means including said column conductor of said selected column for applying a third transverse magnetizing field to the central domains of all of the storage elements in said selected column, the magnitude of said third transverse magnetizing field being substantially equal to that of said second transverse magnetizing field, the magnetic dipoles in said central domains rotating toward a direction substantially transverse to said preferred axis in response to said third transverse magnetizing field thereby causing sense signals to be induced in said sense conductors, the orientation of the magnetic dipoles of said neighboring domains being substantially unaffected by said third transverse magnetizing field, the demagnetizing fields originating within said neighboring domains being effective upon the termination of said third transverse magnetizing field to cause the dipoles in said central domains to rotate back to their pre-interrogation states, and means for utilizing the sense signals induced in said sense conductors.

19. A data store comprising, in combination, a thin film memory array including rows and columns of discrete thin ferromagnetic film storage elements, said elements being capable of attaining opposed states of residual flux density along a preferred axis of magnetization, each of said elements comprising a plurality of distinct regions of ferromagnetic material including a central region having a lesser absolute value of anisotropy field than that of neighboring regions which are contiguous with said central region along borders thereof which lie substantially parallel to said preferred axis, a plurality of transverse-drive column conductors coupled to the storage elements of respective ones of said columns and substantially aligned with said preferred axis of magnetization, a plurality of row conductors coupled to the storage elements of respective ones of said rows and substantially oriented at right angles to said preferred axis of magnetization, said plurality of row conductors including respective pluralities of parallel-drive conductors and sense conductors, transverse-drive selection means connected to said plurality of column conductors, information current driver means connected to said parallel drive conductors, sense amplifier means connected to said sense conductors, control signal means, said control signal means being operatively connected to enable said transverse-drive selection means to provide current flow through a selected one of said column conductors thereby applying a first transverse magnetizing field to the storage elements in said selected column, said first transverse magnetizing field having a magnitude equal to or greater than the absolute value of the anisotropy field of said neighboring sections of each of said storage elements, said control signal means concurrently causing said information driver means to provide respective current flow of one polarity or the other through said row conductors thereby applying to the row elements coupled thereto a first parallel magnetizing field in one direction or the other along said preferred axis, the respective predetermined states attained by the storage elements situated in said selected column upon the cessation of said first transverse magnetizing field being determined by the direction of said first parallel magnetizing field, substantially all of the magnetic dipoles of each of said last storage elements being oriented in the same direction whereby said elements constitute large locking domains of said predetermined states, said control signal means being operatively connected to enable said transverse-drive selection means to provide current flow through said selected column conductor thereby applying a second transverse magnetizing field to each of the storage elements in said selected column, said second transverse magnetizing field having a magnitude approximately equal to the absolute value of the anisotropy field of the central region of each of said storage elements, the direction of magnetization of the central region of each of the elements in said selected column being rotated to a magnetically unstable position in response to said second transverse field, the magnetization of said neighboring regions of said predetermined state being substantially unaffected by said second transverse field, the demagnetizing fields originating from the dipoles within said neighboring regions tending to cause the direction of magnetization of said central regions to rotate to states opposite to said predetermined states, said central regions constituting central domains of one state bordered by neighboring regions constituting neighboring domains of opposite state.

20. A data store as defined in claim 19 further characterized in that said control signal means is adapted to cause said information driver means to provide respective current through said row conductors so as to apply to the row storage elements coupled thereto a second parallel magnetizing field acting in the same direction as said demagnetizing fields, said second parallel magnetizing field tending upon the termination of said second transverse magnetizing field to facilitate the rotation of magnetic dipoles in said central regions to respective states opposite to said predetermined states.

21. A data store as defined in claim 20 including means for interrogating the state of said central domains comprising said control signal means operatively connected to enable said transverse-drive selection means to provide current flow through said selected column conductor thereby causing a third transverse magnetizing field to be applied to said central domains of the storage elements in said selected column, the magnitude of said third transverse magnetizing field being substantially equal to that of said second transverse magnetizing field, said third transverse magnetizing field causing the magnetic dipoles in said central domains to rotate toward a direction substantially transverse to said preferred axis, the rotation of the dipoles in said central domains causing sense signals to be generated in the respective sense conductors, said sense signals being applied respectively to said sense amplifiers, the orientation of the magnetic dipoles of said neighboring domains being substantially unaffected by said third transverse magnetizing field, the demagnetizing fields originating within said neighboring domains being effective upon the termination of said third transverse magnetizing field to cause the dipoles in said central domains to rotate back to their pre-interrogation states.

22. A data store as defined in claim 21 further including memory register means connected in common to the output of said sense amplifiers and to a further source of input information, said memory register being connected to said information driver means, the information stored in said register determining the polarity of the current supplied to said row conductors by said information driver means.

References Cited in the file of this patent

UNITED STATES PATENTS 3,092,813 Broadbent ---------------- June 4, 1963

OTHER REFERENCES

IBM Technical Disclosure Bulletin, vol. 3, No. 2, July 1960, p. 51, #33.

Electronics, pp. 126–129, February 17, 1961, #39.